United States Patent
Winsnes et al.

(10) Patent No.: US 10,390,489 B2
(45) Date of Patent: Aug. 27, 2019

(54) GRAIN CART WITH AIR NOZZLE

(71) Applicant: Optimal Agricultural Equipment Ltd., Blackfalds (CA)

(72) Inventors: Stuart Douglas Winsnes, Reed Deer (CA); Andrew Lodge, Red Deer (CA); Cory Cooley, Red Deer (CA)

(73) Assignee: Optimal Agricultural Equipment Ltd., Blackfalds, AB (CA)

( * ) Notice: Subject to any disclaimer, the term of this patent is extended or adjusted under 35 U.S.C. 154(b) by 23 days.

(21) Appl. No.: 15/811,095

(22) Filed: Nov. 13, 2017

(65) Prior Publication Data

US 2019/0141899 A1    May 16, 2019

(51) Int. Cl.
| | |
|---|---|
| *B65G 67/24* | (2006.01) |
| *A01D 90/10* | (2006.01) |
| *B60P 1/42* | (2006.01) |
| *B08B 9/032* | (2006.01) |
| *B08B 5/02* | (2006.01) |
| *B60S 1/66* | (2006.01) |

(52) U.S. Cl.
CPC ............... *A01D 90/10* (2013.01); *B08B 5/02* (2013.01); *B08B 9/0328* (2013.01); *B60P 1/42* (2013.01); *B60S 1/66* (2013.01)

(58) Field of Classification Search
CPC . B65G 67/24; A01D 90/10; B60S 1/62; B60P 1/40; B60P 1/42
USPC .................. 414/526, 519, 520; 198/313, 608
See application file for complete search history.

(56) References Cited

U.S. PATENT DOCUMENTS

| | | | | | |
|---|---|---|---|---|---|
| 2,743,549 | A | * | 5/1956 | Bauer | A01C 15/04 222/42 |
| 3,638,816 | A | * | 2/1972 | Mann | B65G 41/002 414/504 |
| 4,157,150 | A | * | 6/1979 | Hetrick | E01C 19/2005 198/670 |
| 4,846,605 | A | * | 7/1989 | Christianson | B65G 53/28 406/41 |
| 4,907,402 | A | * | 3/1990 | Pakosh | A01F 12/00 414/505 |
| 5,655,872 | A | * | 8/1997 | Plotkin | B60P 1/40 198/313 |
| 7,891,930 | B2 | * | 2/2011 | Brown | B65G 53/24 406/153 |
| 9,725,025 | B2 | * | 8/2017 | Meier | B60P 1/60 |

(Continued)

*Primary Examiner* — Joseph A Dillon, Jr.
(74) *Attorney, Agent, or Firm* — Adrian D. Battisor; Ade & Company Inc.; Ryan W. Dupuis

(57) ABSTRACT

An agricultural cart for transporting different particulate materials includes a transport container a row of hoppers for containing agricultural product such as harvested grain to be carried away from the field and seed and fertilizer for filling a seeder during seeding. The cart includes a transport tube with across a bottom of the hoppers and a discharge tube extending upwardly and outwardly to one side, each including an auger flight. An air blower is mounted on a front end of the cart for generating a stream of air and a nozzle mounted on the cart and arranged to direct the stream of air into the cart and particularly into the transport tubes toward the discharge end to clean them out. The transport tube includes inlet doors which can be closed and there is provide a closure gate between the transport tube and the discharge tube.

32 Claims, 9 Drawing Sheets

(56) References Cited

U.S. PATENT DOCUMENTS

| | | | |
|---|---|---|---|
| 2003/0175103 A1* | 9/2003 | Hunt | A01D 41/1208 414/526 |
| 2004/0184905 A1* | 9/2004 | Kinzenbaw | B60P 1/40 414/526 |
| 2005/0238470 A1* | 10/2005 | Wood | B60P 1/42 414/526 |
| 2010/0158619 A1* | 6/2010 | Stokes | B60P 1/00 406/63 |
| 2013/0089398 A1* | 4/2013 | Farley | A01D 41/127 414/526 |
| 2013/0280019 A1* | 10/2013 | Dekoning | B60P 1/42 414/526 |
| 2014/0365170 A1* | 12/2014 | Van Mill | B60P 1/42 702/173 |
| 2015/0239384 A1* | 8/2015 | Meier | B60P 1/60 414/489 |
| 2016/0010295 A1* | 1/2016 | Boschung | B60P 1/40 239/650 |
| 2017/0151590 A1* | 6/2017 | Komiyama | B08B 5/023 |
| 2018/0054959 A1* | 3/2018 | Lira | B65G 33/34 |
| 2018/0279552 A1* | 10/2018 | Ricketts | A01D 61/008 |
| 2018/0295776 A1* | 10/2018 | Carpenedo | B60P 1/42 |
| 2018/0303032 A1* | 10/2018 | Loutz | B65G 33/14 |
| 2019/0016547 A1* | 1/2019 | Elias | B65G 37/005 |

\* cited by examiner

GRAIN CART WITH AIR NOZZLE

This invention relates to an agricultural cart for transporting particulate material such as grain, seed and fertilizer.

BACKGROUND OF THE INVENTION

Grain carts are farm implements that are typically towed behind a tractor and are used to transport harvested grain from other implements, such as combines, and deliver the grain to trucks or other hauling devices away from the harvest field. The use of grain carts allows the harvester to unload in the field to increase efficiency and so trucks can remain off the field.

Grain carts typically include a storage carrier that further includes at a with a total capacity ranging from several hundred to over one thousand bushels of grain. To unload the grain from the cart, grain carts employ a conveying device such as an auger to draw grain from the bottom of the hopper and convey it to a discharge end. At the discharge end the material is carried through a feed tube by a further auger that deposits the grain to a discharge location. The conveyor transports grain from the base of the hopper upward so that it may be deposited into another container which can be a transport truck when transporting grain or can be a seeder when the cart is used to fill the seed tank of a seeder.

At the bottom of the hopper, where the conveyor meets the hopper, is typically a door that must be opened in order for grain to flow onto the conveyor. The door serves the purpose of keeping the grain or other material in the hopper until the operator desires to remove the material, and also of allowing the conveyor to come up to speed while under minimal load before the grain is loaded onto the conveyor. To provide power to the conveyor, grain carts are typically driven by a Power Take-off ("PTO") driveshaft typically located at the rear end of a tractor.

SUMMARY OF THE INVENTION

According to the invention there is provided an agricultural cart for transporting particulate material comprising:

a frame mounted on ground wheels for transport across agricultural land;

a transport container including one or more hoppers for containing agricultural product for transportation of the product across the agricultural land to a required location;

a conveyor receiving the particulate material from said one or more hoppers of the container for discharge of the particulate material from the container;

an air blower mounted on the cart for generating a stream of air;

and a nozzle mounted on the cart and arranged to direct the stream of air toward a surface of the cart.

The air stream and the nozzle are preferably arranged to be toward a surface of the conveyor so as to clean out the conveyor. However the nozzle can be used for other purposes in the cart for example for cleaning out other areas of the cart.

In one particular example, the conveyor has a bottom portion for transporting the particulate material across a bottom of the container and the nozzle is arranged to direct the stream of air onto a surface within the bottom portion of the conveyor to clean out the bottom portion. Where the bottom portion includes a bottom tube extending along the bottom of the container with an inlet from the container into the tube, preferably the nozzle is arranged to direct the stream of air into the bottom tube along the tube. In order that the air stream moves to the discharge end to clean out the whole there is preferably provided a closure door for closing the inlet so that the stream of air along the bottom tube can only escape from the discharge end of the tube.

In many cases the conveyor also has a upstanding portion for transporting the particulate material from a bottom of the container to a discharge location and the nozzle is arranged to direct the stream of air into the upstanding portion to clean out the upstanding portion. In this arrangement preferably there is provided a closure gate at an inlet end of the upstanding portion or between the two portions so that the stream of air cannot back up into the bottom portion and can only escape at the discharge end.

Preferably the conveyor comprises a tube containing an auger flight and the nozzle is arranged to direct the stream of air into the tube at the end wall so as to impinge on the auger flight and swirls around the flight to clean out the tube. However this arrangement herein can also be used with other types of conveyor.

In addition or as an alternative to the clean out described above, the nozzle can also be arranged to direct the stream of air toward the discharge end to accelerate flow of the particulate material along the tube.

Preferably the container comprises a plurality of hoppers in a row along the container and the conveyor comprises a tube underneath the hoppers for carrying the particulate material to one end of the container with each hopper including a closure door for closing off passage of the particulate material into the tube. In this arrangement preferably the closure door of at least one hopper moves to a side of the tube opposite to that of at least one other hopper.

The air blower is preferably mounted on a front end of the cart adjacent a hitch of the cart and is arranged to be driven by a PTO coupling for receiving power from a tractor and includes a hose extending from the front end of the cart to the rear end for connection to the nozzle.

Preferably the air blower includes a splitter feeding two separate hoses and a diverter valve for selecting one or both of the hoses for the stream of air.

Preferably the upstanding portion of the conveyor includes a spout having an upper spout portion and a lower spout portion connected to the upper spout portion for rotation about an upright axis, and defining a mouth arranged to discharge substantially vertically downwardly at a position offset from the axis so that rotation of the lower spout portion about the axis acts to move the mouth to different positions around the axis.

The arrangement herein therefore provides the advantage that the cart is arranged for transporting different materials and the nozzle is arranged to clean out the conveyor after discharge of one material before discharging another material.

The unit thus is able to act as a grain cart as well as a seed tender vehicle. In the spring it will be used to fill air tanks behind air drills very quickly and in the fall be used as a grain cart alongside combines.

In order to be used as a seed tender cart the augers are cleaned completely out when changing from product to product. To accomplish this, forced air is blown into the end of both the horizontal auger along the bottom of the cart as well as the vertical auger going up to air tank or truck. This air can go through one auger at a time or possibly both at the same time. In order to achieve a sealed chamber (auger) for air to successfully clean out product in the horizontal auger there are sliding doors at the bottom of the hoppers that close, thus stopping the flow of grain into the auger as well as sealing it off so it can be blown out.

The arrangement herein can also be used as an air assist for the auger where the air stream injected into the auger tube is used to increase flow capacity of the auger. This arrangement can be used for example in regular grain augers, combines, frac-sand applications, and augers that move shavings and all kinds of products.

The application of cleaning both in the horizontal and inclined augers tubes is typically used when this machine is used as a seed tender cart for filling air tanks behind seeding equipment. When changing from seed to fertilizer no excess material remains in the augers which will prevent contamination of seed and fertilizer. As well, the operator does not have to contend with the excess material that typically remains in fill augers of air tanks which typically requires reversing the auger then having to carry pails of it to the top of the tank and dumping them in. the arrangement herein is cleaner, faster, and more safe. When this machine is used as a grain cart the doors on the bottom of the hoppers all open in unison. The centre door opens from the opposite side to ensure material empties evenly from both sides of the tank so as to not overload one side. The blower system typically is not be used during this application for clean out, but it can be used to increase capacity of flow of the material in the augers.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
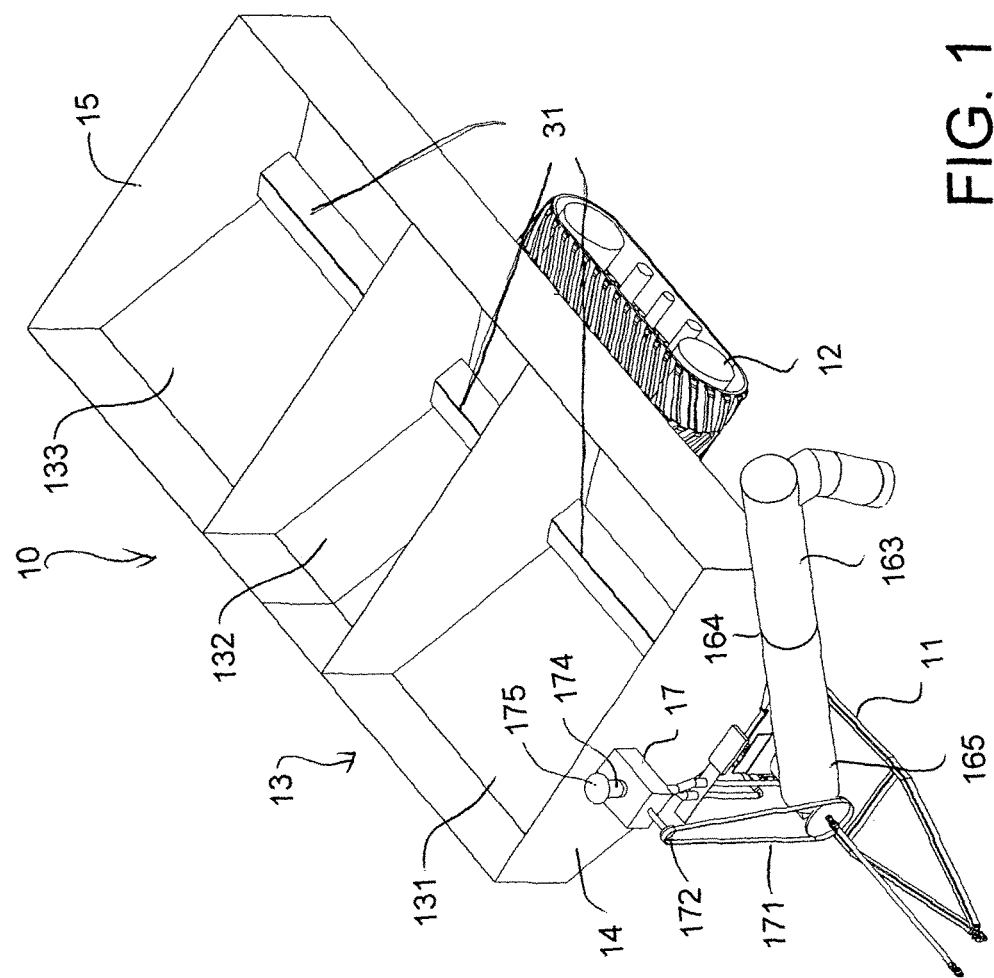
FIG. 1 is an isometric view of an agricultural cart according to the present invention.

The agricultural cart 10 shown in FIGS. 1 to 6 for transporting particulate material includes a frame schematically indicated at 11 mounted on ground wheels or tracks 12 for transport across agricultural land. The cart carries a transport container 13 including three hoppers 131, 132 and 133 arranged in a row between a front end wall 14 and a rear end wall 15 each for containing agricultural product for transportation of the product across the agricultural land to a required location. As set above the cart can be used as a grain cart or as a filling system for seeders, but also other uses are possible. The ground wheels therefore are typically selected for travel over agricultural land rather than as highway wheels intended for high speed travel.

Figure 2:
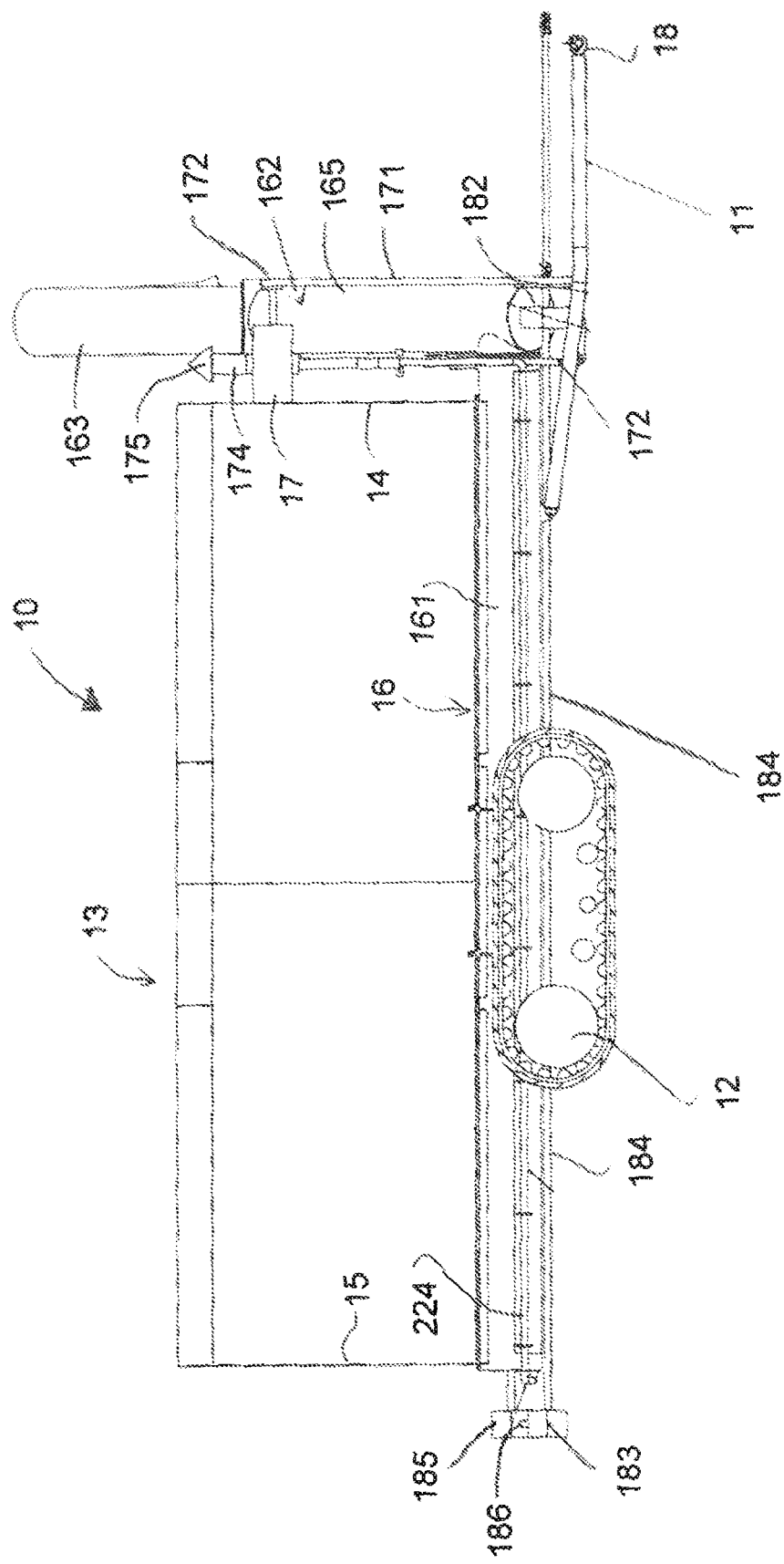
FIG. 2 is a longitudinal cross-section of the cart of FIG. 1.
Figure 3:
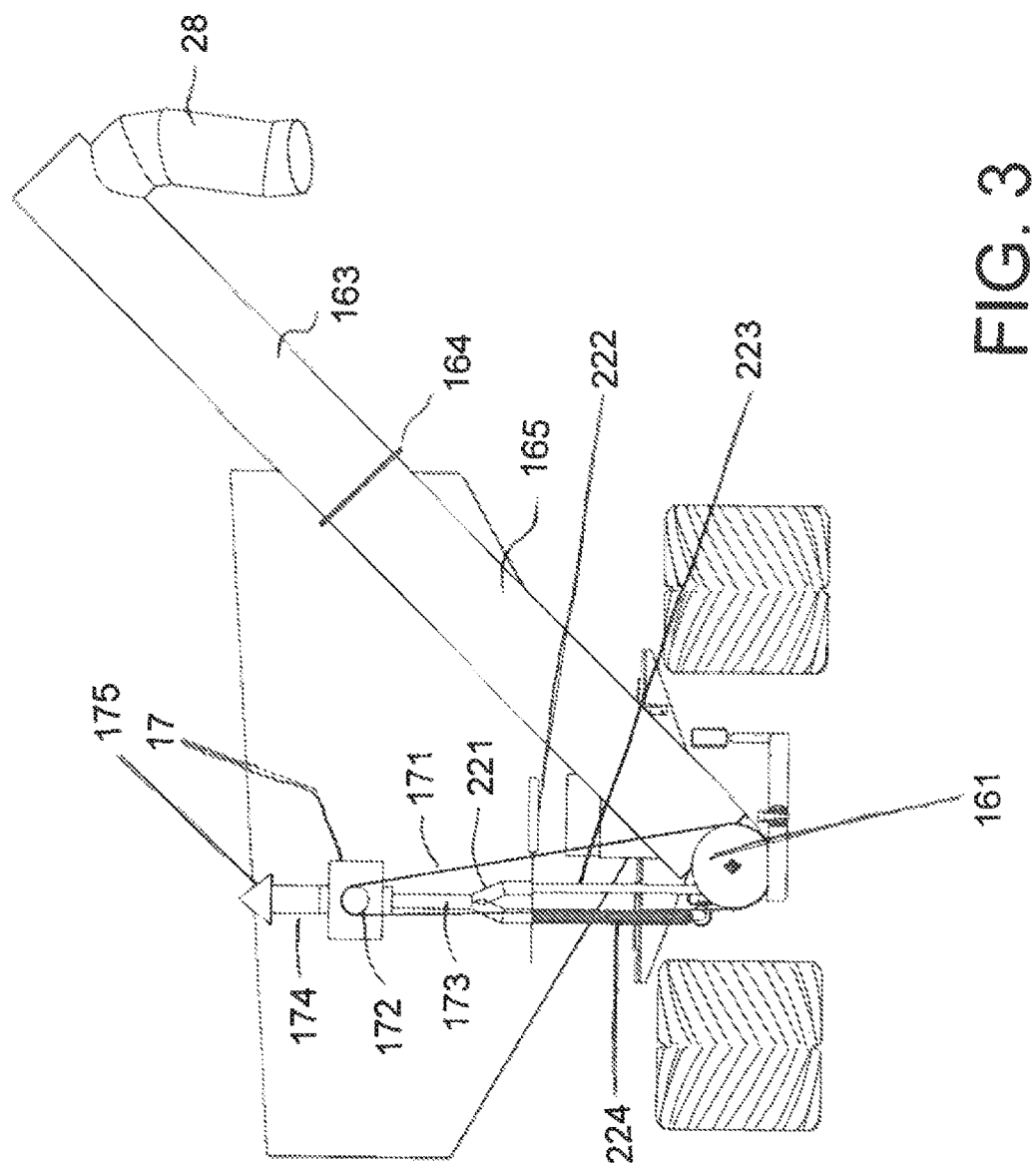
FIG. 3 is an end elevational view of the cart of FIG. 1.

As best shown in FIG. 2 there is provided a conveyor 16 receiving the particulate material from the hoppers of the container for discharge of the particulate material from the hoppers. The conveyor 16 has a horizontal bottom portion 161 for transporting the particulate material across a bottom of the container to a discharge end at the front wall 14 and an upstanding portion 162 in front of the wall 14 for transporting the particulate material from a bottom of the container to a discharge location. The upstanding portion 162 is inclined upwardly and to one side of the cart and includes a hinged upper section 163 which can be folded at a hinge line 164 relative to a lower second section 165.

Figure 9:
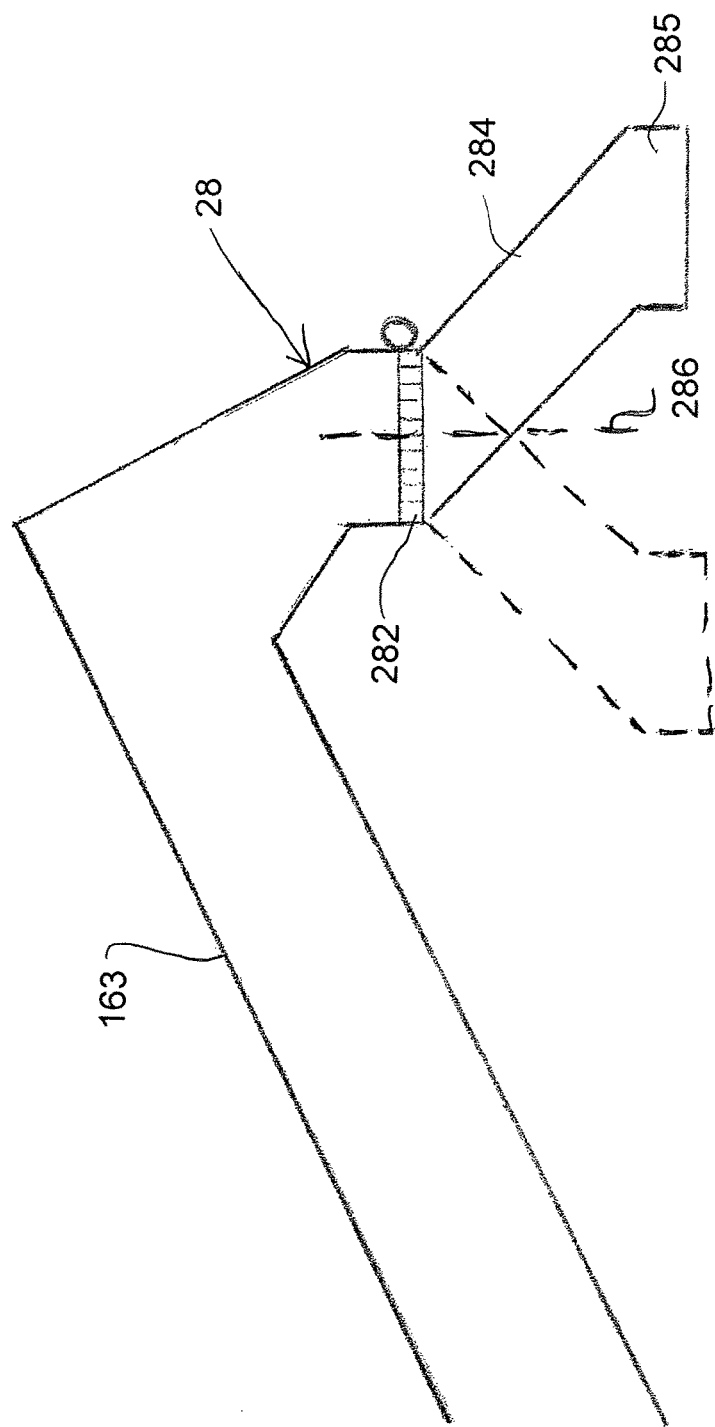
FIG. 9 is a side elevational view of the discharge spout of the inclined side auger portion.

A discharge spout shown in FIG. 9 at the upper end can be provided and can be connected to feed conduits to provide filling of adjacent containers such as a container of a seeder or a hopper of a separate feed auger.

An air blower 17 is mounted on the front wall 14 the cart for generating a stream of air. The blower 17 is driven by a belt 171 between a pulley 172 on the blower and a pulley 181 on a PTO coupling 18 connected to a tractor. The PTO coupling 18 at the front wall is adjacent a hitch (not shown) connecting the frame 11 to a towing tractor, again typically used for agricultural use rather than highway speeds.

The blower 17 has an air output 173 at the bottom of a housing carried on the front wall 14. An air intake 174 for the blower on top of the housing includes a silencer 175.

Figure 7:
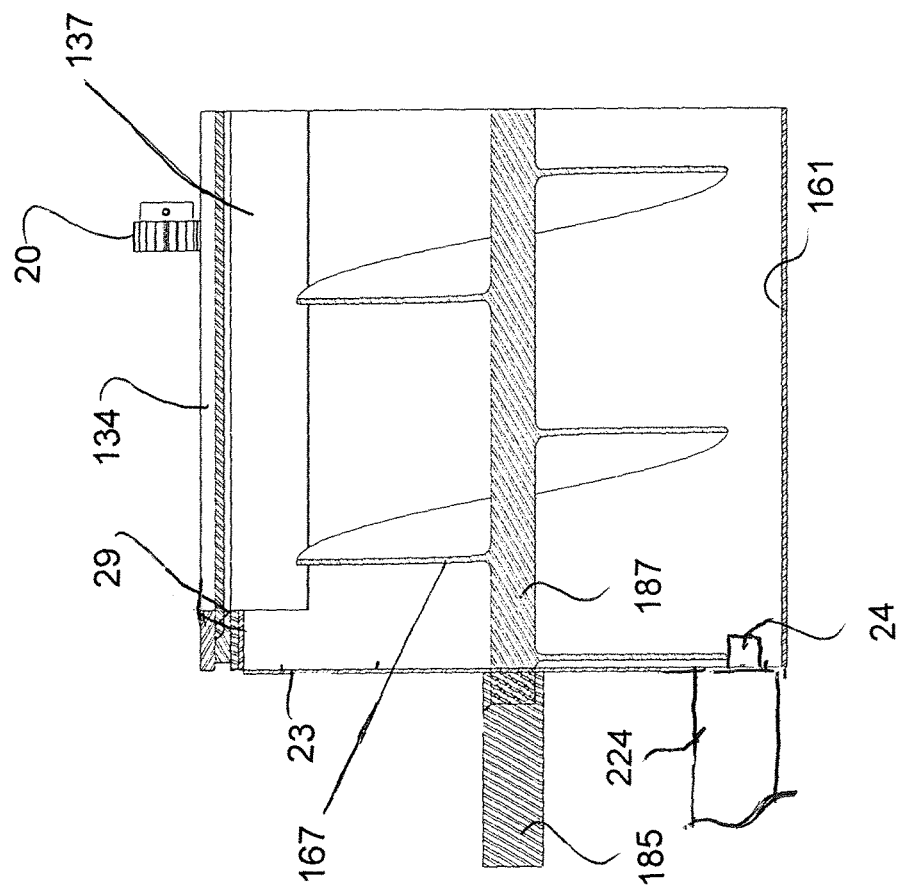
FIG. 7 is a partial longitudinal cross-section along the lines 7-7 Of FIG. 4 of the bottom discharge auger of the cart of FIG. 1.

The PTO coupling 18 also connects to a first gear box 182 which drives a second gear box 183 at the rear wall 15 through a shaft 184 which extends along the underside of the conveyor tube position 161. The right angle gear box 183 drives a third right angle gear box 185 through a shaft 186. The gear box 185 drives a shaft 187 of the conveyor as best shown in FIG. 7. That is the conveyor 161 comprises an auger tube 166 containing a flight 167 mounted on the shaft 187.

The gear box 182 also provides an output shaft 188 which forms the auger shaft of the inclined conveyor 162 and carries an auger flight 189 within the tube portion 162.

Figure 4:
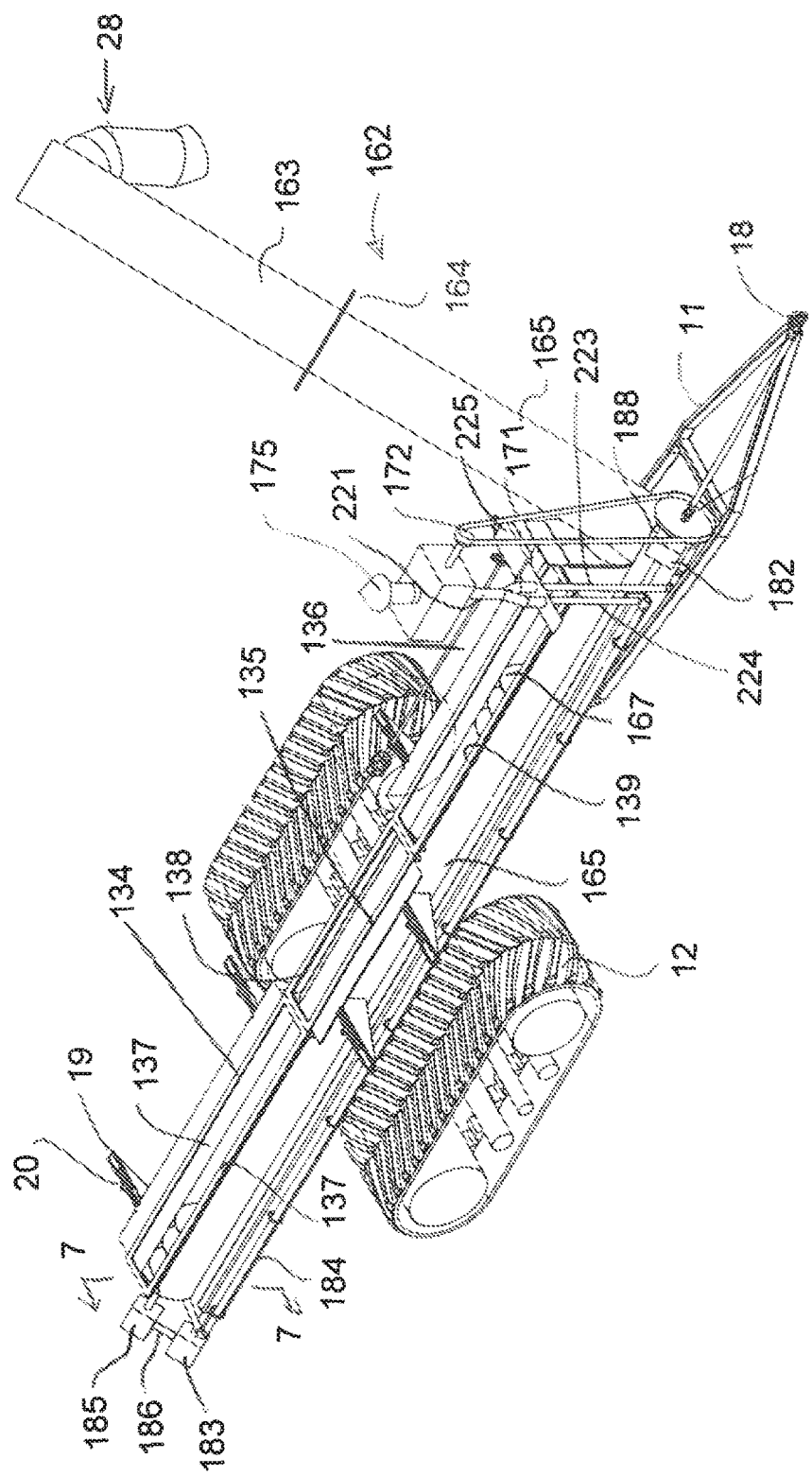
FIG. 4 is isometric view of the operating components of the cart of FIG. 1.

The bottom tube 165 Is located underneath the hoppers 131, 132 and 133 for carrying the particulate materials therefrom to a discharge end of the tube at the front end wall 14 of the container. As best shown in FIG. 4, each hopper includes a respective closure door 134, 135, 136 for closing off passage of the particulate material from the hopper into the tube. The doors are each provided as a rectangular horizontal plate sliding across a rectangular horizontal opening formed across the top of the tube 165. Each door is actuated by a pair of linear actuators one at each end in the form of a rack 19 driven by a gear 20 from a motor 21.

The cart thus has three separate hoppers, each with a sliding adjustable door at the bottom. The doors can be controlled so that all are open or only specific ones depending on which hopper is to be emptied. The amount of opening can be controlled between fully closed and fully open to vary feed rate. They are controlled via a single orbital motor 21 for each door. Each motor turns gear 20 that in turn moves the rack 19 that is attached to the doors to control the flow of product and to seal the horizontal auger at the time of clean out.

As shown in FIG. 4, the closure door 135 of the hopper 132 moves to a side of the tube opposite to the doors 134 and 136 of the hoppers 131 and 133. This acts to balance the unloading.

The outlet 173 of the blower 17 is connected to an air supply system 22 including a splitter 221 feeding two separate hoses 223 and 224 and a diverter valve 222 operable by a slider 225 for selecting one or both of the hoses for the stream of air. The hose 224 extends from diverter valve 222 at the front end 14 of the cart to the rear end 15 for connection to the rear end of the tube 161. The hose 223 extends from the diverter valve 222 to the bottom end of the tube 162. As best shown in FIG. 7, the hose 224 connects to an end wall 23 of the tube 161 where there is provided a nozzle 24 which is arranged at the bottom of the tube 161 so that the air stream from the hose passes longitudinally along the tube and particularly along the bottom part of that wall.

The nozzle 24 is thus mounted on the cart and arranged to direct the stream of air toward a surface of the cart and in this case against the surface of the auger flight 167 within the tube 161. The injected air is forced by the flight outwardly against the inside surface of the tube and thus tends to swirl around the outside edge of the flight at the tube acting to drive any collected material at this location along the tube to the discharge end thus cleaning out the whole tube effectively and completely. In one example the airflow can be of the order of 1400 cfm and is arranged to pass through a pipe of the order of 2-3 inch diameter to a smaller nozzle at a pressure of around 15 psi into a 17 inch diameter auger tube and this has been found to provide full cleaning of any remaining material after the auger flight has carried out as much as it is able to do.

The hose 223 is connected at its end 226 to a second nozzle 241 similar to the nozzle 24 but located at the bottom end of the tube 162. This acts to inject the air into the tube at the bottom in the same manner to clean out the tube 161.

A similar nozzle is mounted at the bottom of the incline auger and has the same construction and operation as described above.

A hydraulically actuated slide gate 26 is mounted across the tube 161 at the junction with the tube 162 so that when the gate is actuated the duct 161 is closed off from the duct 162 to prevent air injected into the tube 162 from going backwards into the tube 161.

The doors 134, 135 and 136 are controlled automatically according to how much weight of product has left the tank while unloading. When a required weight has been delivered or the hoppers are empty, the doors are closed and the horizontal auger is still running. This causes the majority of product remaining in the auger tube 161 to generally clean out. However there is always small amounts of seed or fertilizer remaining in the auger. To completely clean this horizontal auger the blower 17 is now activated. To turn the blower on the system uses a controlled idler (not shown) to tighten the belt 171 and start the blower turning. The air diverter valve 222 sends all of the air from the blower to the rear of the machine through hose 224 and forces it into the horizontal auger. While the auger is turning the forced air carries all remaining seeds and product to the inclined auger. At this point the hydraulic activated sliding gate 26 mounted between the horizontal auger and the incline auger is closed sealing the inclined auger tube 162 so that it may be blown out while the auger flight in the tube 162 is running. In order to have the sliding gate 26 at the front beyond the shaft 187, the shaft is driven from the rear end 15 by the gear box 185 previously describe. Thus the two gearboxes 183, 185 are mounted at the rear of the machine to turn the horizontal auger flight 187. The air diverter valve 222 now sends the air through the hose 223 to the base of the inclined auger tube 162 forcing air through it while the auger flight is running carrying all product out the top and completely cleaning it of all material. At this point the blower is deactivated and the auger flights stopped.

A shown in FIG. 9, the spout 28 of the auger portion 163 includes an upper spout portion 281 which is fixed to the auger portion 163 and discharges downwardly at a horizontal ring 282 into a lower spout portion 284. The ring 282 defines an upstanding swivel axis 286 The portion 284 is inclined downwardly and outwardly from the axis 286 so as to form a downwardly facing mouth 285 spaced by a distance of the order of 24 inches from the axis. The lower portion is rotatable around the axis 286 at the ring 282 so that the mouth follows an annular path around the axis 286. This allows the spout and particularly the mouth to discharge vertically downwardly at different locations and at different spacing from the side wall of the container.

There are two main functions of the doors 134, 135 and 136. One is to control the flow of product flowing into the horizontal auger. The other is to seal the horizontal auger 167 so that while the auger is running and the air is turned on no air escapes out of the horizontal tube other than out the one end. The doors are designed to leave the least amount of blank space between the fighting of the auger and the door when it is closed. This encourages the flow of air to be directed in the direction desired and not leave product suspended in the air between the flighting and the bottom side of a door (inside the auger). It also helps to maintain a better air pressure inside the horizontal tube.

Figure 5:
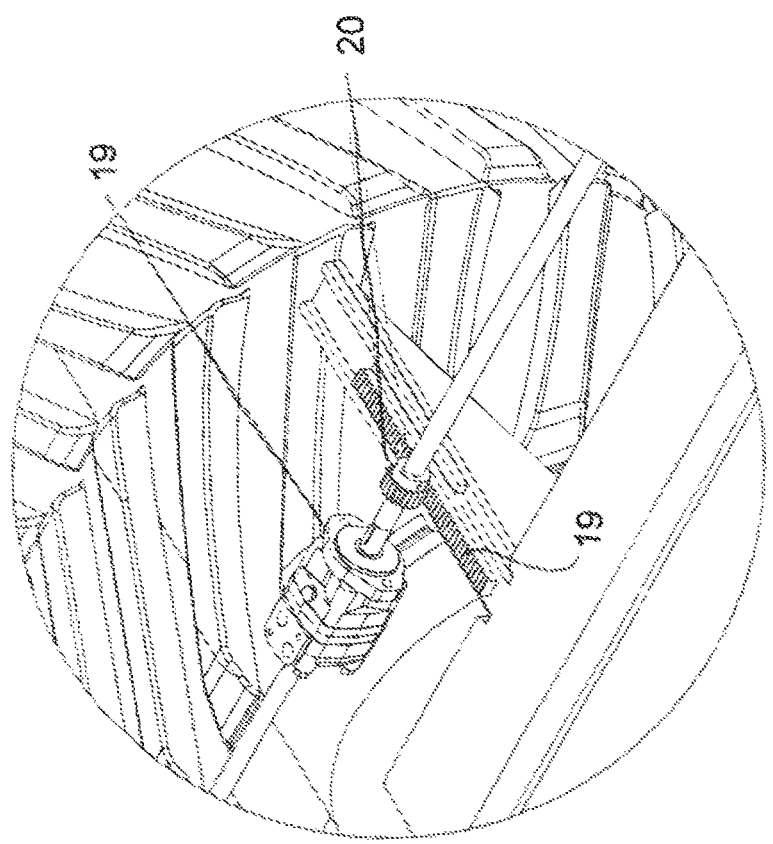
FIG. 5 is an isometric view of one door at one end of the operating components the cart of FIG. 1.
Figure 6:
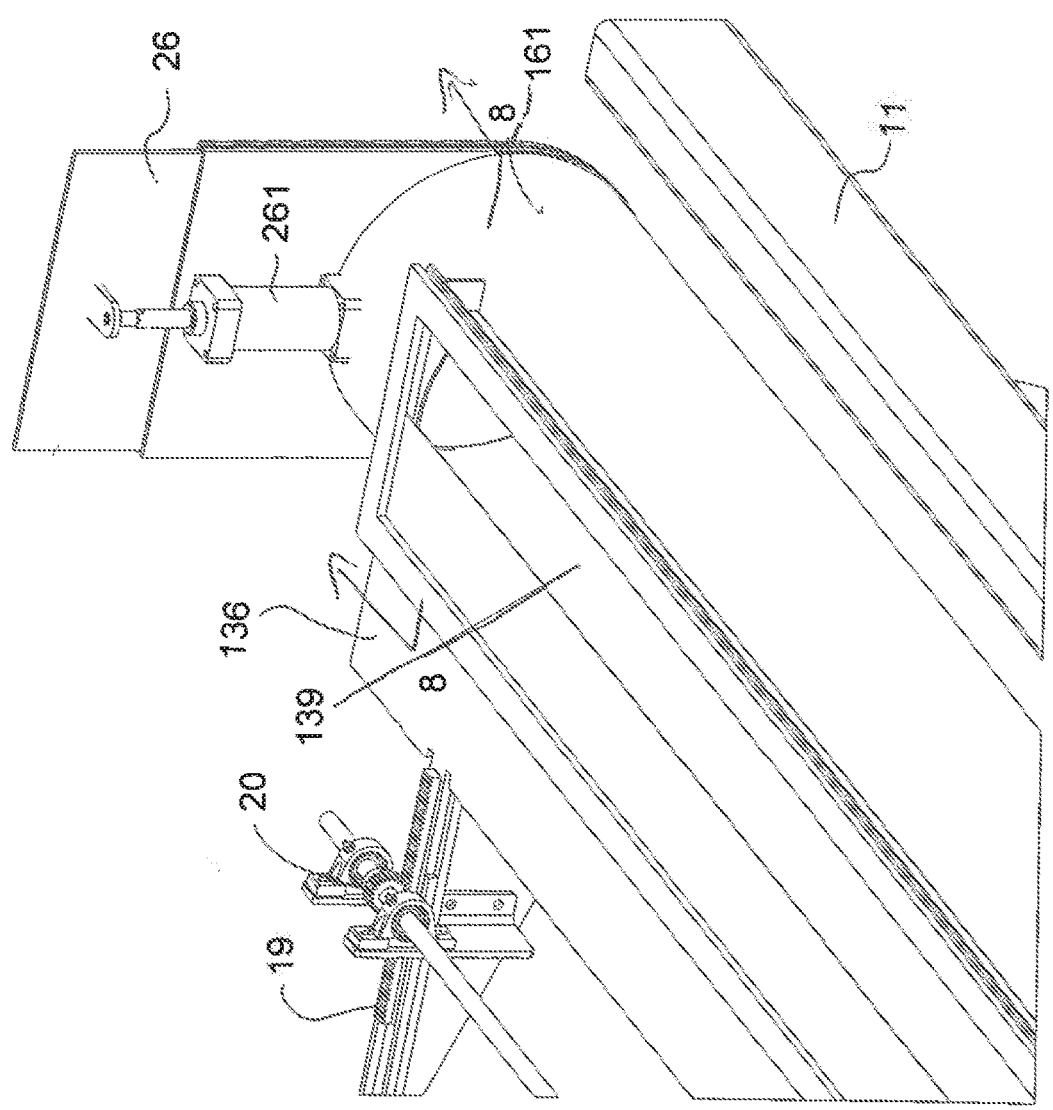
FIG. 6 is an isometric view of one door and a closure gate at an opposed end of the operating components the cart of FIG. 1.

FIG. 5 shows a close up of one of the orbital motors which opens and closes the door. It turns two to three spur gears (two are shown) per door which are seated into a rack. Using this system allows the doors to be opened evenly and easily. They can be opened partially or completely depending on the amount of product flow the operator desires. Using this orbital motor/spur/rack system will allow the door to be closed quickly for an emergency stop or where the desired amount of product has been dropped out of the hopper.

Figure 8:
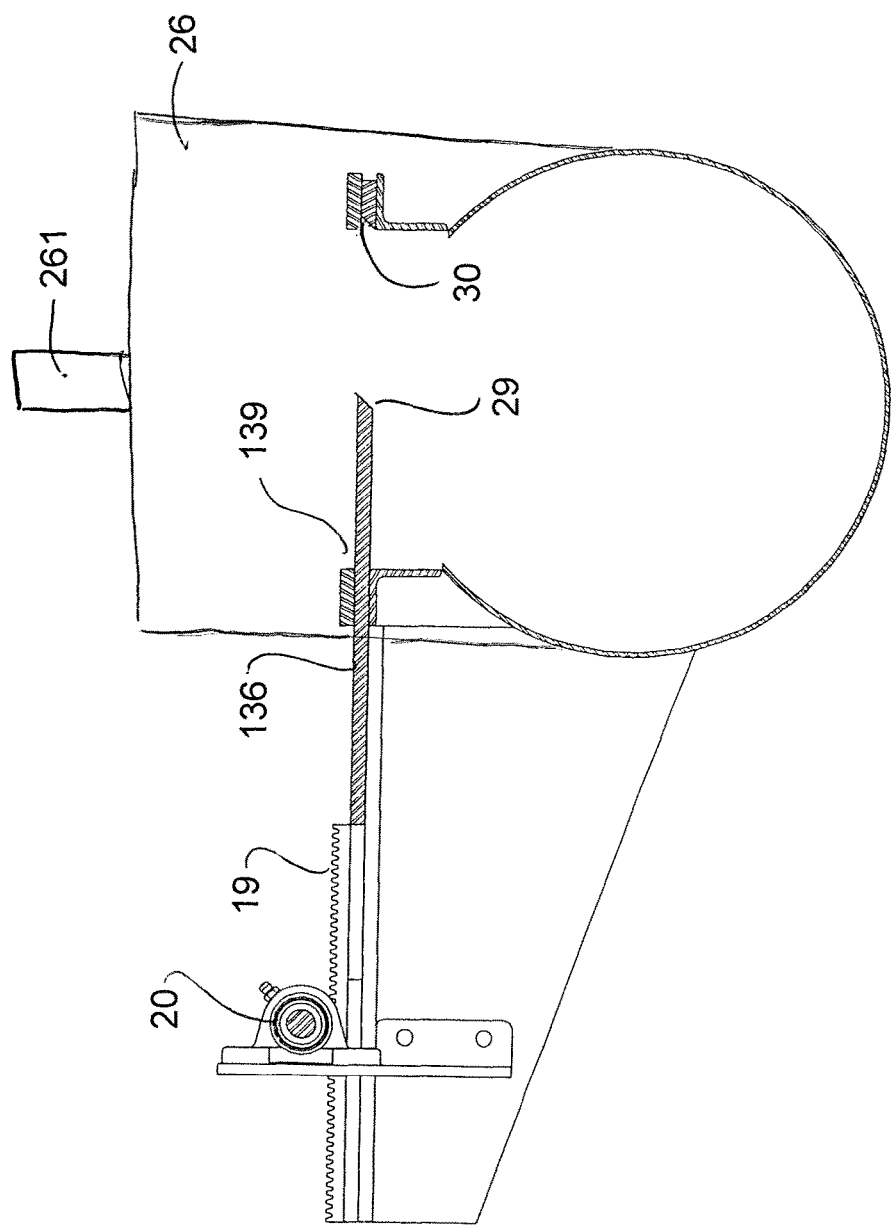
FIG. 8 is a partial longitudinal cross-section along the lines 6-6 of FIG. 6 of the bottom discharge auger of the cart of FIG. 1.

As shown in FIG. 8, each door such as door 136 has bevelled front edges 29 bevelled rearwardly and downwardly which cooperate with bevelled edges 30 at the side edge of the respective opening 139 to shed any resting material. The reason for those edges is so that material does not hang up along the edges of the door frames. If the edges were not bevelled, material would become lodged in the crevices of the door frame when the door is opened and material flows out. Also upon the door closing, product that is passing by the door will not become pinched or squashed along the edge of the door and door frame.

Above the doors on the inside of the hoppers as shown in FIG. 1 is provided a triangular or roof shaped cover 31 with an upstanding apex along the center of the cover. The cover is spaced from the bottom wall of the hopper so that the material slides under the cover to the underlying opening. It is commonly used to take the weight of material off the auger but will be used here to aid in taking some of the weight off of the doors so that they may be opened and closed easier.

The doors 134, 135 and 136 can be opened and closed manually with a hydraulic lever or they can be controlled via a remote which an operator can use while standing on the top of an air tank observing how full his seeding tank is.

Once the operator has closed the door 134, 135, 136 of the hopper that is presently being emptied, he can then remotely turn on the blower and allow the air to clean out the horizontal auger of remaining product. Then the gate 26 between the augers is closed as to seal both augers from each other. This horizontal/vertical separator gate 26 s opened and closed with a hydraulic cylinder 261 and can also be controlled remotely. Once again as above with the doors this gate is designed to allow the least amount of empty air space between the flighting of the vertical auger and the gate. The surfaces of the frame of the gate is also angled downwardly to shed the material and so as to not allow material to hang up or become lodged in any crevice or ledges.

The blower turns at approximately 3600 rpm and is driven off of the driveline that runs the main gearbox at the bottom of the incline auger. The driveline is driven by a tractor and PTO that turns at a rated speed of 1000 rpm. Belts and pulleys are used to achieve the proper speed of the blower. It puts out 1400 cfm at around 12-15 psi. A silencer 175 is mounted near the air intake of the blower for operator comfort.

The air diverter valve 222 is used to direct the air flow from the blower to either the horizontal auger or the vertical or incline auger. As the control system is activated and is closing, this valve will switch to direct air flow from the horizontal auger to the vertical auger. As the gate 26 is activated hydraulically then so is this diverter valve 222. They work in unison as when the gate is open air is always diverted to the horizontal tube. As the gate is closed air will always be diverted to the incline auger.

At the top of the incline auger is a unique spout. The spout is designed with a downward angle and can be turned to fill 2-3 hoppers of an air tank from one position. The turning of the spout is controlled electrically. An electric motor turns a worm gear which allows the spout to turn 360 degrees. So from one position of the incline auger the operator can turn the spout to fill one hole then spin it remotely to the next hole in the air tank. The spout is designed to direct product vertically straight down as opposed to exiting the spout at an angle which competitors do. This will allow a more accurate placement of exiting product and will allow proper filling procedures of air tanks. Product leaving an inclined spout at an angle to the vertical acts fill one side of the air tank more than the other leaving empty space and an inconsistent load.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural cart for transporting particulate material comprising:
    a frame mounted on ground wheels for transport across agricultural land;
    a transport container including one or more hoppers for containing particulate material for transportation of the particulate material across the agricultural land to a required location;
    a conveyor receiving the particulate material from said one or more hoppers of the container for discharge of the particulate material from the container;
    wherein the conveyor comprises a tube having a first end and a discharge end;
    said one or more hoppers having a discharge opening for connection to the tube at one or more locations from the first end to the discharge end so that the particulate material from said one or more hoppers enters the tube;
    a transport device in the tube which carries the particulate material along the tube from said one or more locations to the discharge end of the tube;
    an air blower mounted on the cart for generating a stream of air;
    and at least one nozzle mounted at or adjacent the first end of the tube directing the stream of air into the tube so as to travel from said at least one nozzle at or adjacent the first end along the tube to the discharge end so as to clean out the tube through the discharge end.

2. The agricultural cart according to claim 1 wherein the transport device comprises an auger flight.

3. The agricultural cart according to claim 1 wherein the tube extends underneath said one or more hoppers and carries the particulate material to one end of the cart.

4. The agricultural cart according to claim 1 wherein there is provided a closure door for closing the discharge opening so that the stream of air along the tube can only escape from the discharge end of the tube.

5. The agricultural cart according to claim 1 wherein the tube comprises an upstanding portion of the conveyor for transporting the particulate material from a bottom of the container to a discharge location.

6. The agricultural cart according to claim 1 wherein said at least one nozzle is located adjacent a bottom surface of the tube directing the stream of air along the bottom surface.

7. The agricultural cart according to claim 1 wherein conveyor has a bottom tube transporting the particulate material across a bottom of the container to one end of the cart and an upstanding tube transporting the particulate material from said bottom of the container at said one end of the cart to a discharge location and said at least one nozzle comprises a first nozzle component which directs the stream of air along the bottom tube to clean out the bottom tube and a second nozzle component arranged to direct the stream of air along the upstanding tube to clean out the upstanding tube.

8. The agricultural cart according to claim 7 wherein there is provided a closure gate at an inlet end of the upstanding tube so that the stream of air can only escape at the discharge location.

9. The agricultural cart according to claim 1 wherein the container comprises a plurality of hoppers in a row along the container and wherein the tube is located underneath the hoppers for carrying the particulate material from each of the hoppers to said discharge end of the tube of the container.

10. The agricultural cart according to claim 9 wherein each hopper includes a closure door for closing off passage of the particulate material into the tube.

11. An agricultural cart for transporting particulate material comprising:
    a frame mounted on ground wheels for transport across agricultural land;
    a transport container including one or more hoppers for containing particulate material for transportation of the particulate material across the agricultural land to a required location;
    a conveyor receiving the particulate material from said one or more hoppers of the container for discharge of the particulate material from the container;
    wherein the conveyor comprises a first tube having a first end and a discharge end, the first tube extending along the transport container at a bottom of the transport container;
    said one or more hoppers having a discharge opening for connection to the first tube at one or more locations from the first end to the discharge end so that the particulate material from said one or more hoppers enters the first tube;
    a first transport device in the first tube which carries the particulate material along the first tube from said one or more locations to the discharge end of the first tube;
    wherein the conveyor comprises an upstanding tube having a first end of the upstanding tube connected to the discharge end of the first tube for transporting the particulate material from said bottom of the transport container;

a second transport device in the second tube which carries the particulate material along the second tube;

an air blower mounted on the cart for generating a stream of air;

a nozzle connected to the upstanding tube directing the stream of air into the upstanding tube so as to travel from the nozzle along the upstanding tube so as to clean out the upstanding tube;

and a closure gate at the first end of the upstanding tube to prevent the stream of air from entering the first tube.

12. The agricultural cart according to claim 11 wherein each transport device comprises an auger flight.

13. The agricultural cart according to claim 11 wherein the first tube extends underneath said one or more hoppers and carries the particulate material to one end of the cart, wherein there is provided a second nozzle directing the stream of air along the first tube to the discharge end thereof and wherein there is provided a closure door for closing the discharge opening so that the stream of air along the first tube can only escape from the discharge end of the first tube.

14. The agricultural cart according to claim 13 wherein the second nozzle is located adjacent a bottom surface of the first tube directing the stream of air along the bottom surface.

15. The agricultural cart according to claim 13 wherein the container comprises a plurality of hoppers in a row along the container and wherein the first tube is located underneath the hoppers for carrying the particulate material from each of the hoppers to said discharge end of the tube.

16. An agricultural cart for transporting particulate material comprising:
    a frame mounted on ground wheels for transport across agricultural land;
    a transport container including one or more hoppers for containing particulate material for transportation of the particulate material across the agricultural land to a required location;
    a conveyor receiving the particulate material from said one or more hoppers of the container for discharge of the particulate material from the container;
    wherein the conveyor comprises a tube having a first end and a discharge end;
    said one or more hoppers having a discharge opening for connection to the tube at one or more locations from the first end to the discharge end so that the particulate material from said one or more hoppers enters the tube;
    a transport device in the tube which carries the particulate material along the tube from said one or more locations to the discharge end of the tube;
    an air blower mounted on the cart for generating a stream of air;
    and a nozzle mounted in an end wall of the tube at the first end of the tube directing the stream of air longitudinally along the tube so as to travel from the nozzle along the tube to the discharge end so as to clean out the tube through the discharge end.

17. The agricultural cart according to claim 16 wherein the nozzle is located adjacent a bottom surface of the tube directing the stream of air along the bottom surface.

18. The agricultural cart according to claim 16 wherein the transport device comprises an auger flight.

19. The agricultural cart according to claim 16 wherein the container comprises a plurality of hoppers in a row along the container and wherein the tube is located underneath the hoppers for carrying the particulate material from each of the hoppers to said discharge end of the tube.

20. An agricultural cart for transporting particulate material comprising:
    a frame mounted on ground wheels for transport across agricultural land;
    a transport container including one or more hoppers for containing particulate material for transportation of the particulate material across the agricultural land to a required location;
    a conveyor receiving the particulate material from said one or more hoppers of the container for discharge of the particulate material from the container;
    wherein the conveyor comprises a tube having a first end and a discharge end;
    said one or more hoppers having a discharge opening for connection to the tube at one or more locations from the first end to the discharge end so that the particulate material from said one or more hoppers enters the tube;
    a transport device in the tube which carries the particulate material along the tube from said one or more locations to the discharge end of the tube;
    an air blower mounted on the cart for generating a stream of air;
    a nozzle connected to the tube directing the stream of air into the tube so as to travel from the nozzle along the tube so as to clean out the tube;
    wherein said one or more hopper includes a closure door for closing off the discharge opening thereof so that air is prevented from escaping from the tube through the discharge opening.

21. The agricultural cart according to claim 20 wherein the transport device comprises an auger flight.

22. The agricultural cart according to claim 20 wherein the nozzle is mounted in an end wall of the tube at the first end of the tube for directing the stream of air longitudinally along the tube.

23. The agricultural cart according to claim 20 wherein the nozzle is located adjacent a bottom surface of the tube directing the stream of air along the bottom surface.

24. The agricultural cart according to claim 20 wherein the container comprises a plurality of hoppers in a row along the container and wherein the tube is located underneath the hoppers for carrying the particulate material from each of the hoppers to said discharge end of the tube of the container and wherein said one or more hopper includes a respective closure door for closing off the discharge opening thereof so that air is prevented from escaping from the tube through the discharge opening.

25. The agricultural cart according to claim 1 wherein the container comprises a plurality of hoppers in a row along the container and wherein the tube is located underneath the hoppers for carrying the particulate material from each of the hoppers.

26. The agricultural cart according to claim 25 wherein each hopper includes a closure door for closing off passage of the particulate material into the tube.

27. An agricultural cart for transporting particulate material comprising:
    a frame mounted on ground wheels for transport across agricultural land;
    a transport container including one or more hoppers for containing particulate material for transportation of the particulate material across the agricultural land to a required location;

a conveyor receiving the particulate material from said one or more hoppers of the container for unloading the particulate material from the container;

wherein the conveyor comprises a tube connected to said one or more hoppers so that the particulate material from said one or more hoppers enters the tube for transport therealong;

an auger flight in the tube arranged such that rotation of the auger flight in an angular direction carries the particulate material in a longitudinal direction along the tube;

an air blower mounted on the cart for generating a stream of air;

and at least one nozzle directing the stream of air into the tube so as to travel from said at least one nozzle along the tube to an opening though which material is discharged;

said at least one nozzle directing the stream of air along the tube in said longitudinal direction so that said at least one nozzle and the flight both carry the material in said longitudinal direction along the tube to said opening.

28. The agricultural cart according to claim 27 wherein the tube extends underneath said one or more hoppers and carries the particulate material to one end of the cart.

29. The agricultural cart according to claim 27 wherein the tube comprises an upstanding portion of the conveyor for transporting the particulate material from a bottom of the container to a discharge location.

30. The agricultural cart according to claim 27 wherein said at least one nozzle is located adjacent a bottom surface of the tube directing the stream of air along the bottom surface.

31. The agricultural cart according to claim 27 wherein conveyor has a bottom tube transporting the particulate material across a bottom of the container to one end of the cart and an upstanding tube for transporting the particulate material from said bottom of the container at said one end of the cart to a discharge location and said at least one nozzle comprises a first nozzle component which directs the stream of air along the bottom tube and a second nozzle component arranged to direct the stream of air along the upstanding tube.

32. The agricultural cart according to claim 31 wherein there is provided a closure gate at an inlet end of the upstanding tube.

* * * * *